United States Patent
Burton

(10) Patent No.: US 10,011,232 B2
(45) Date of Patent: Jul. 3, 2018

(54) INTEGRATED RUNNING BOARD AND SIDE SKIRT SYSTEM AND RELATED METHOD

(71) Applicant: FORD GLOBAL TECHNOLOGIES, LLC, Dearborn, MI (US)

(72) Inventor: Peter Nathanael Burton, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/349,647

(22) Filed: Nov. 11, 2016

(65) Prior Publication Data

US 2018/0134221 A1    May 17, 2018

(51) Int. Cl.
| | |
|---|---|
| *B60R 3/00* | (2006.01) |
| *B60R 3/02* | (2006.01) |
| *B62D 37/02* | (2006.01) |
| *B62D 35/00* | (2006.01) |

(52) U.S. Cl.
CPC ............... *B60R 3/02* (2013.01); *B60R 3/002* (2013.01); *B62D 35/008* (2013.01)

(58) Field of Classification Search
CPC ............ B60R 3/02; B60R 3/002; B60R 19/42
See application file for complete search history.

(56) References Cited

U.S. PATENT DOCUMENTS

| | | | |
|---|---|---|---|
| 4,925,235 A | 5/1990 | Fingerle | |
| 7,318,596 B2 * | 1/2008 | Scheuring, III | ........... B60R 3/02 280/163 |
| 7,717,494 B2 | 5/2010 | Nagahama | |
| 7,780,223 B2 | 8/2010 | Kottenstette et al. | |
| 8,186,746 B2 | 5/2012 | Mackenzie et al. | |
| 2010/0194070 A1 * | 8/2010 | Stauffer | ................. B60R 3/002 280/166 |

FOREIGN PATENT DOCUMENTS

| | | |
|---|---|---|
| DE | 3826542 A1 | 2/1990 |
| JP | 2008120364 A | 5/2008 |

OTHER PUBLICATIONS

English Machine Translation of DE3826542A1.
English Machine Translation of JP2008120364A.

* cited by examiner

*Primary Examiner* — Bryan A Evans
(74) *Attorney, Agent, or Firm* — Jason Rogers; King & Schickli, PLLC

(57) ABSTRACT

An integrated running board and side skirt system is provided for a motor vehicle. That system includes a combined running board and side skirt and a control module. The control module includes a controller configured to displace the combined running board and side skirt between a stowed position, a running board position and an aero-skirt position depending up on a number of data inputs. A related method is also disclosed.

21 Claims, 9 Drawing Sheets

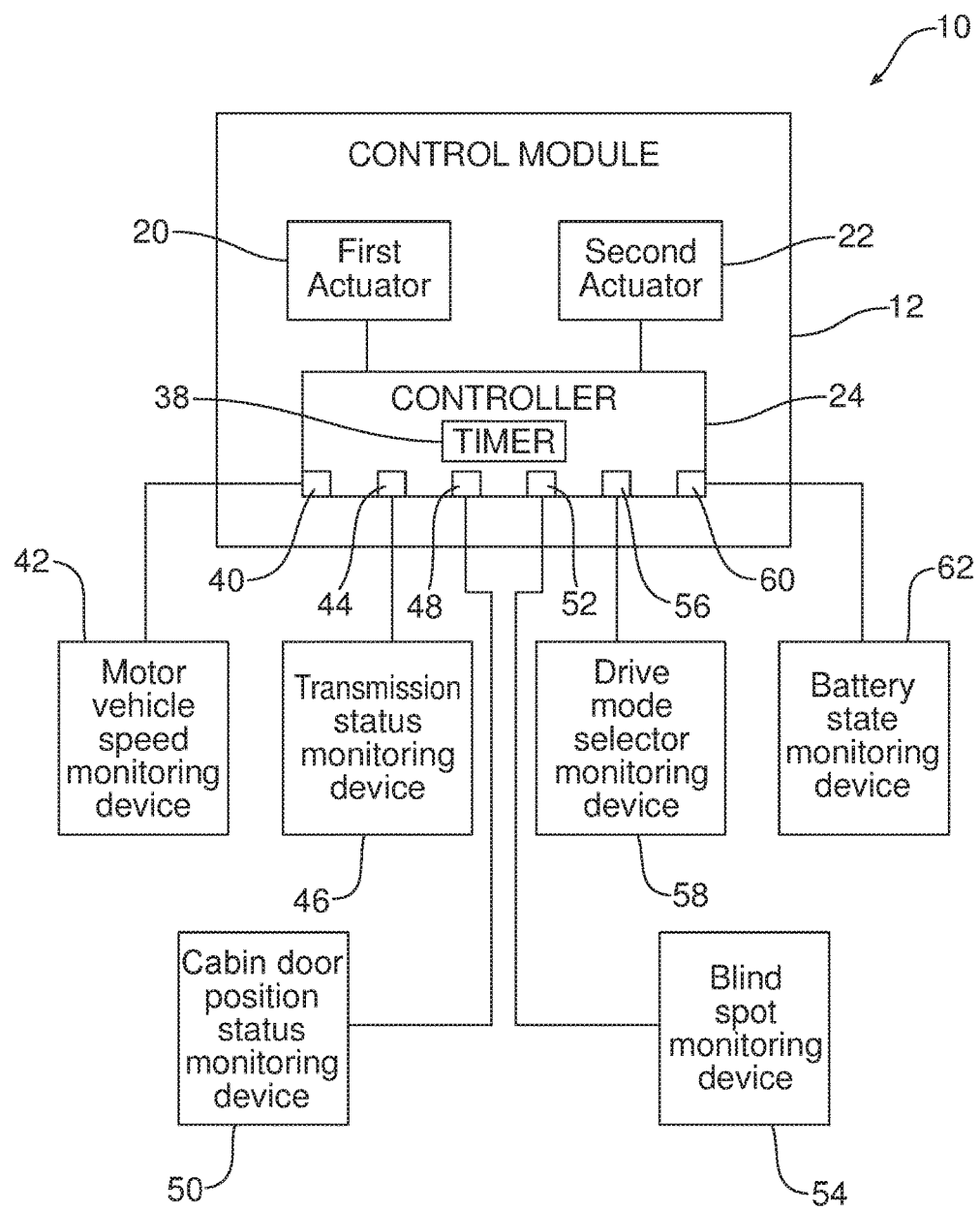

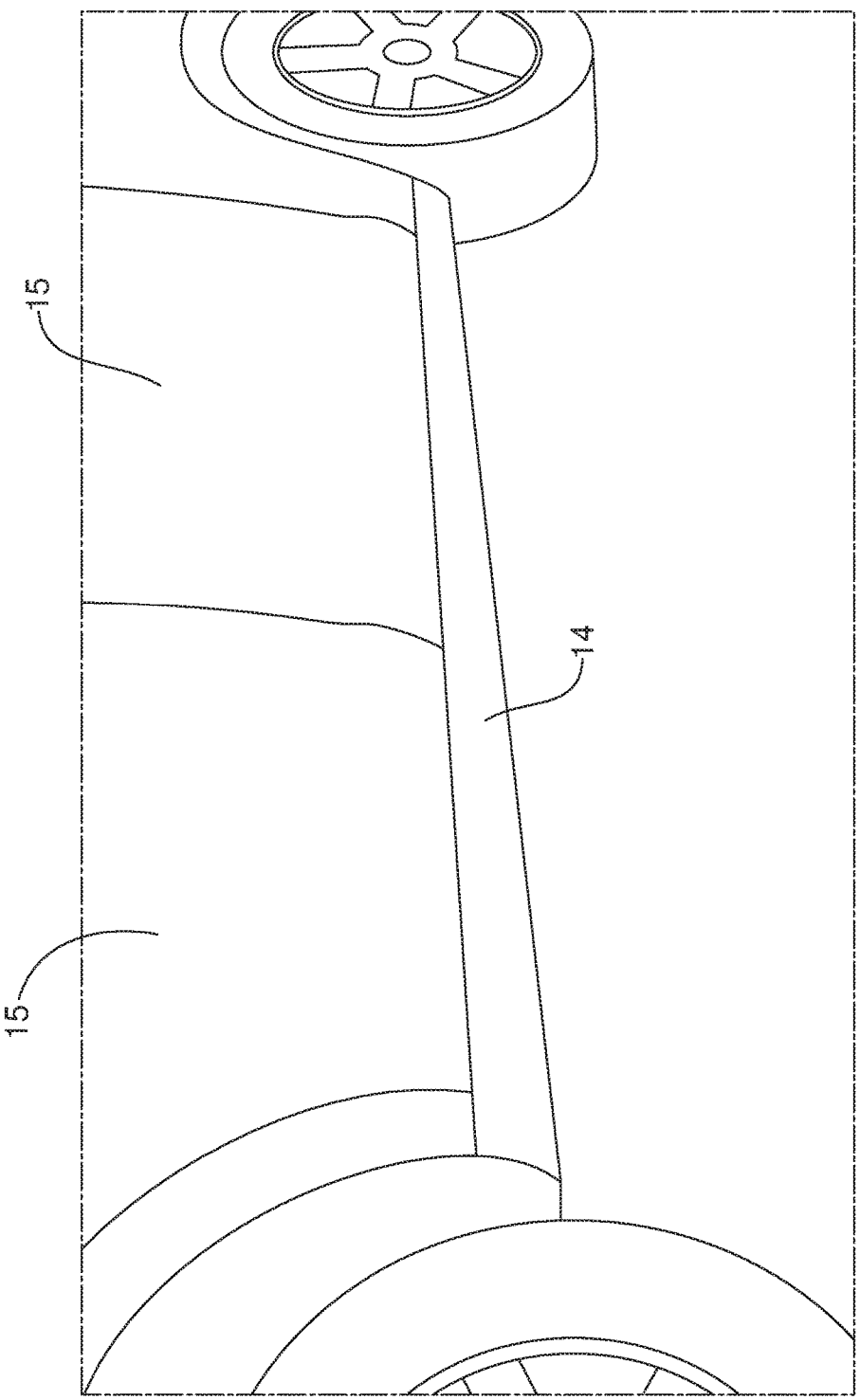

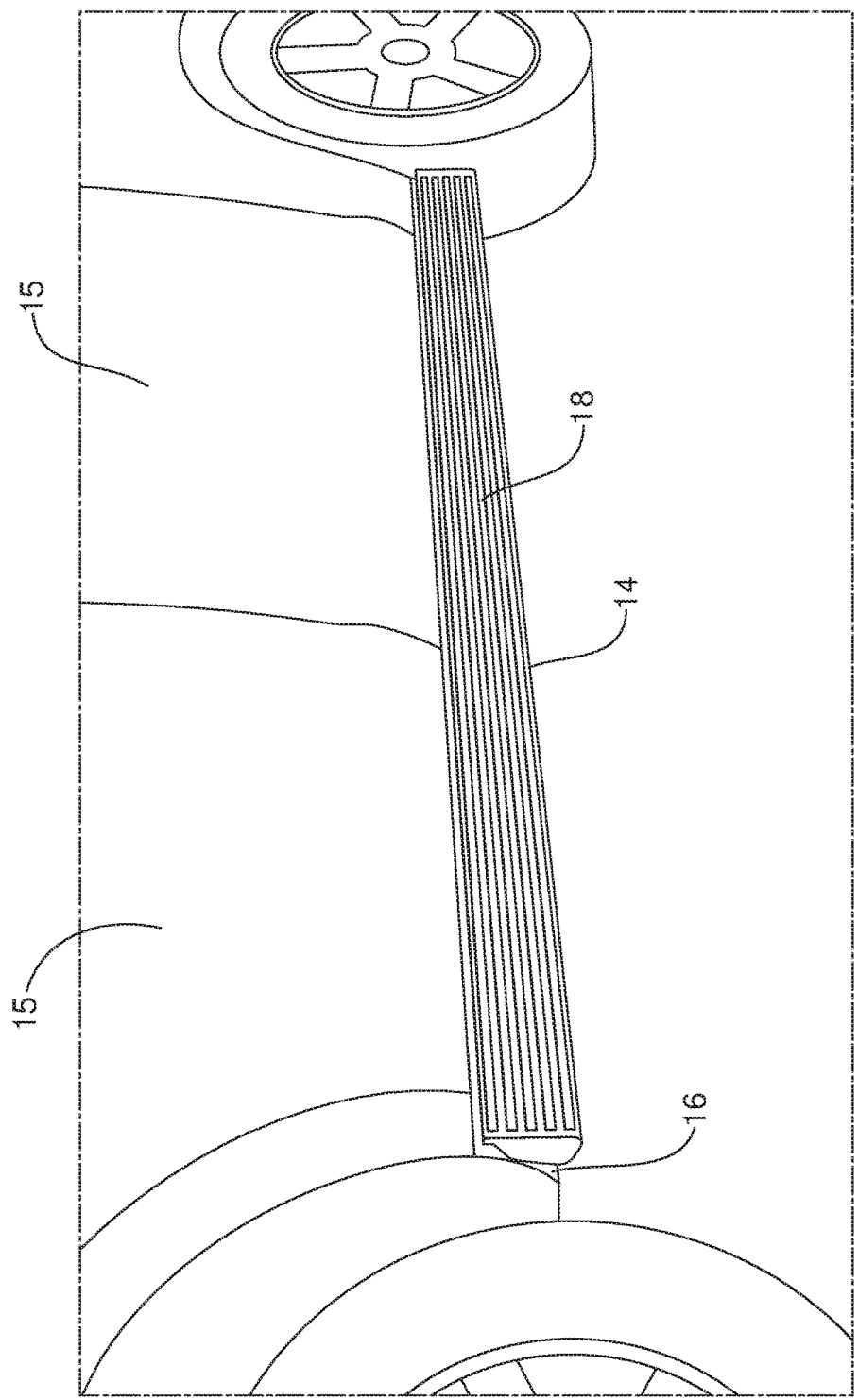

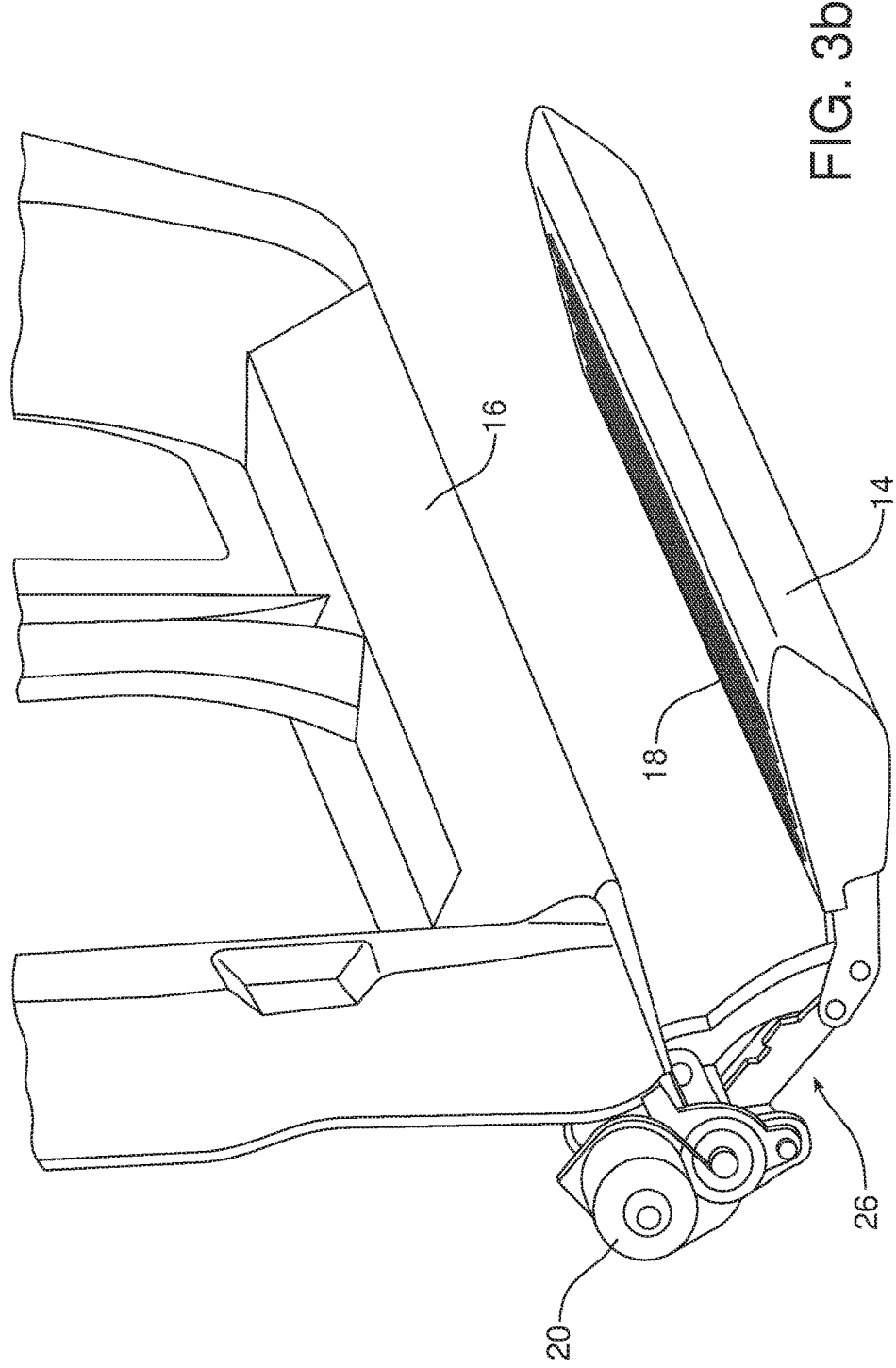

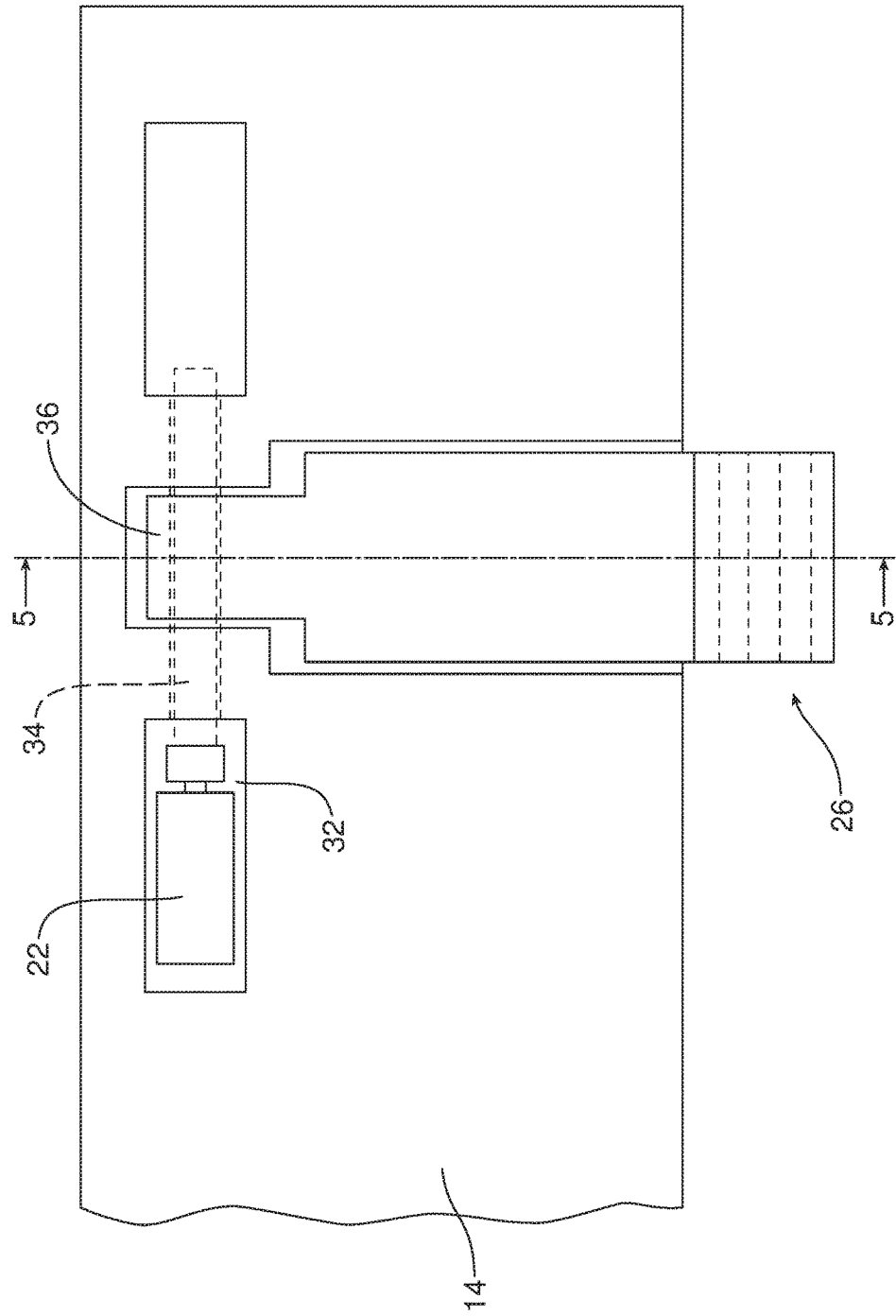

INTEGRATED RUNNING BOARD AND SIDE SKIRT SYSTEM AND RELATED METHOD

TECHNICAL FIELD

This document relates generally to the motor vehicle equipment field and, more particularly, to an integrated running board and side skirt system as well as to a related method of deploying an aerodynamic side skirt.

BACKGROUND

Large sport utility vehicles (SUVs) and pickup trucks have high levels of aerodynamic drag. This is partially due to the amount of air that is able to flow underneath and around these vehicles due to the increased ground clearance inherent in their design. Reducing the ground clearance on these vehicles would significantly compromise other functional attributes desired by users. Accordingly, other means of reducing aerodynamic drag and increasing the operating efficiency of these types of vehicles must be identified.

This document relates to an integrated running board and side skirt system incorporating a combined running board and side skirt that may be selectively displaced between a stowed position raised toward the undercarriage of the motor vehicle, a running board position extended to provide a step to aid in accessing the interior of the motor vehicle and an aero-skirt position deployed beneath the rocker panel of the motor vehicle to direct air flow away from the under surface of the motor vehicle and reduce aerodynamic drag at higher operating speed on roadways.

SUMMARY

In accordance with the purposes and benefits described herein, an integrated running board and side skirt system is provided for a motor vehicle. That integrated running board and side skirt system comprises a combined running board and side skirt and a control module displacing the combined running board and side skirt between a stowed position, a running board position and an aero-skirt position.

The integrated running board and side skirt system may include a linkage connecting the combined running board and side skirt to the motor vehicle. Further the control module of the integrated running board and side skirt system may include a first actuator connected between the motor vehicle and the linkage, a second actuator connected between the linkage and the combined running board and side skirt and a controller. That controller may be configured to displace the combined running board and side skirt between the stowed position, the running board position and the aero-skirt position.

The controller may be configured to include a timer. The controller may be configured to include a data input for transmission state. The controller may be configured to include a data input for motor vehicle speed. The controller may be configured to include a data input for cabin door position. The controller may be configured to include a data input for battery charge state. The controller may be configured to include a data input for blind spot monitor status. The controller may be configured to include a data input for drive mode selector status.

In accordance with an additional aspect, a method is provided for deploying an aerodynamic side skirt. That method may be described as comprising the step of displacing, by control module, a combined running board and side skirt between a stowed position, a running board position and an aero-skirt position.

The method may further include the step of monitoring the transmission state of the motor vehicle by use of a controller of the control module. Further, the method may include the step of monitoring the motor vehicle speed by the controller. Still further the method may include monitoring the position status of the doors of the motor vehicle by use of the controller.

In addition the method may include the step of monitoring the charge state of the battery of the motor vehicle by means of the controller. Further the method may include the step of monitoring the drive mode selector status of the motor vehicle by means of the controller. Still further, the method may include the step of configuring the controller to provide a timer. In addition the method may include the step of monitoring the blind spot monitor status of the motor vehicle by means of the controller.

In addition, the method may include the step of displacing the combined running board and side skirt into the stowed position, the running board position or the aero-skirt position in response to data received by the controller respecting motor vehicle speed. Further, the method may include the step of displacing the combined running board and side skirt into the stowed position, the running board position or the aero-skirt position in response to data received by the controller respecting transmission state and cabin door position status.

In the following description, there are shown and described several preferred embodiments of the integrated running board and side skirt system as well as the related method of deploying an aerodynamic side skirt. As it should be realized, the integrated running board and side skirt system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated running board and side skirt system as well as the related method and together with the description serve to explain certain principles thereof.

FIG. 1 is a schematic block diagram of the integrated running board and side skirt system.

FIG. 2a is a perspective view illustrating the combined running board and side skirt in the stowed position.

FIG. 2c is a perspective view of the combined running board and side skirt in the aero-skirt position.

FIG. 3b is a detailed perspective view illustrating the first actuator, linkage and combined running board and side skirt in the running board position.

FIG. 4 is a schematic illustration of the second actuator connected between the combined running board and side skirt and the linkage.

Reference will now be made in detail to the present preferred embodiments of the integrated running board and side skirt system, examples of which are illustrated in the accompanying drawing figures.

DETAILED DESCRIPTION

Figure 2B:
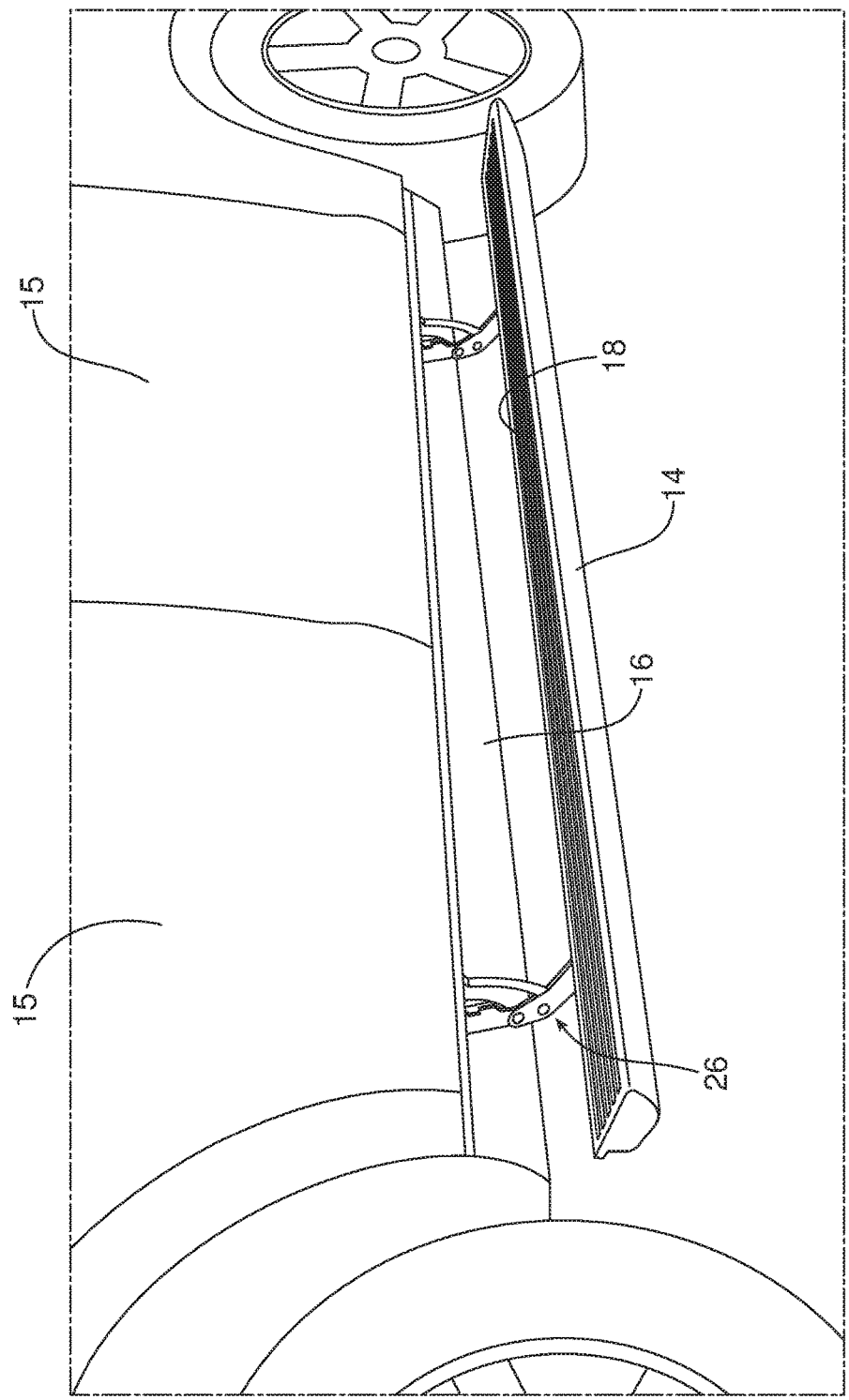
FIG. 2b is a perspective view illustrating the combined running board and side skirt in the running board position.
Figure 3A:
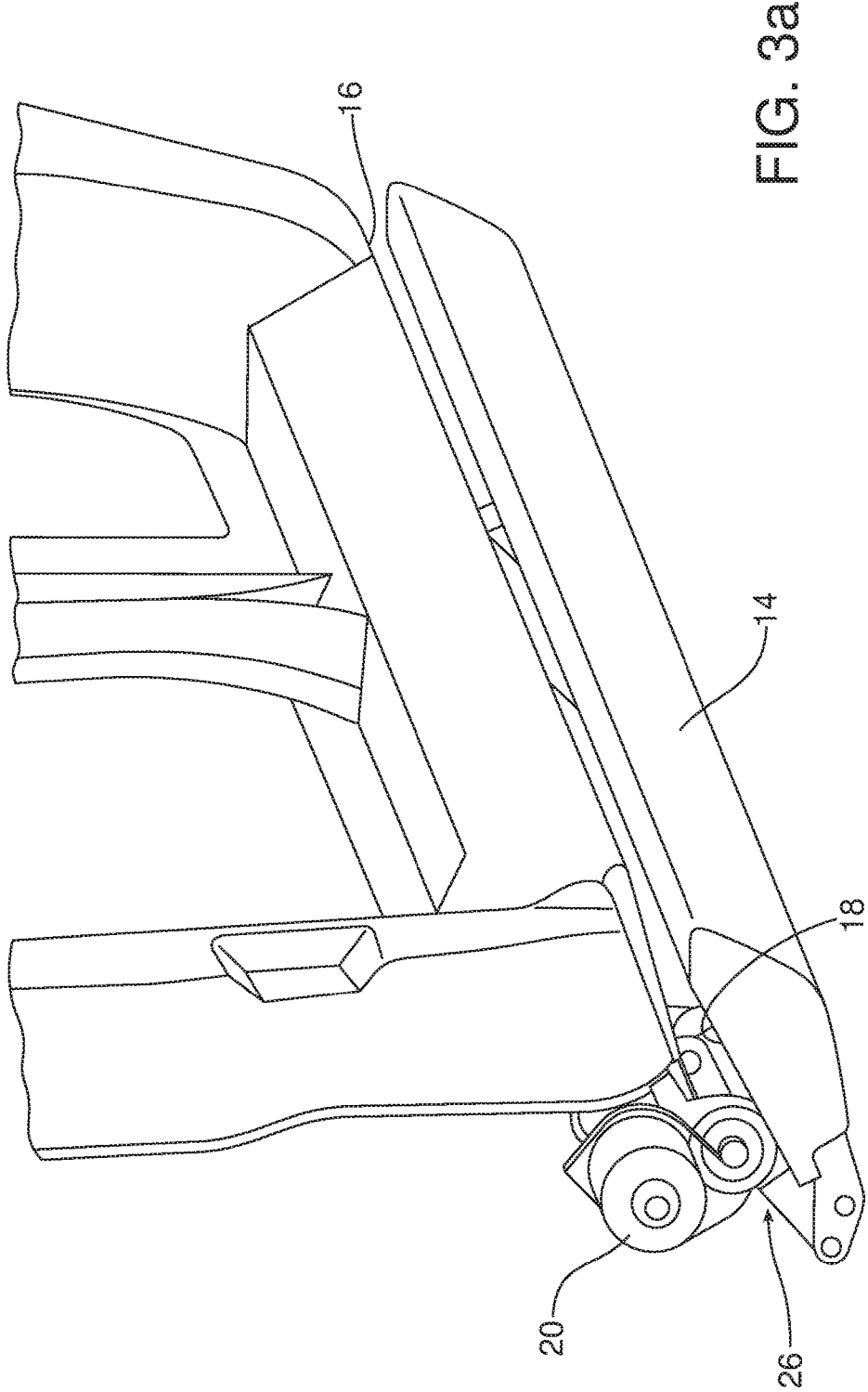
FIG. 3a is a detailed perspective view illustrating the first actuator, the linkage and the combined running board and side skirt in the stowed position.
Figure 3C:
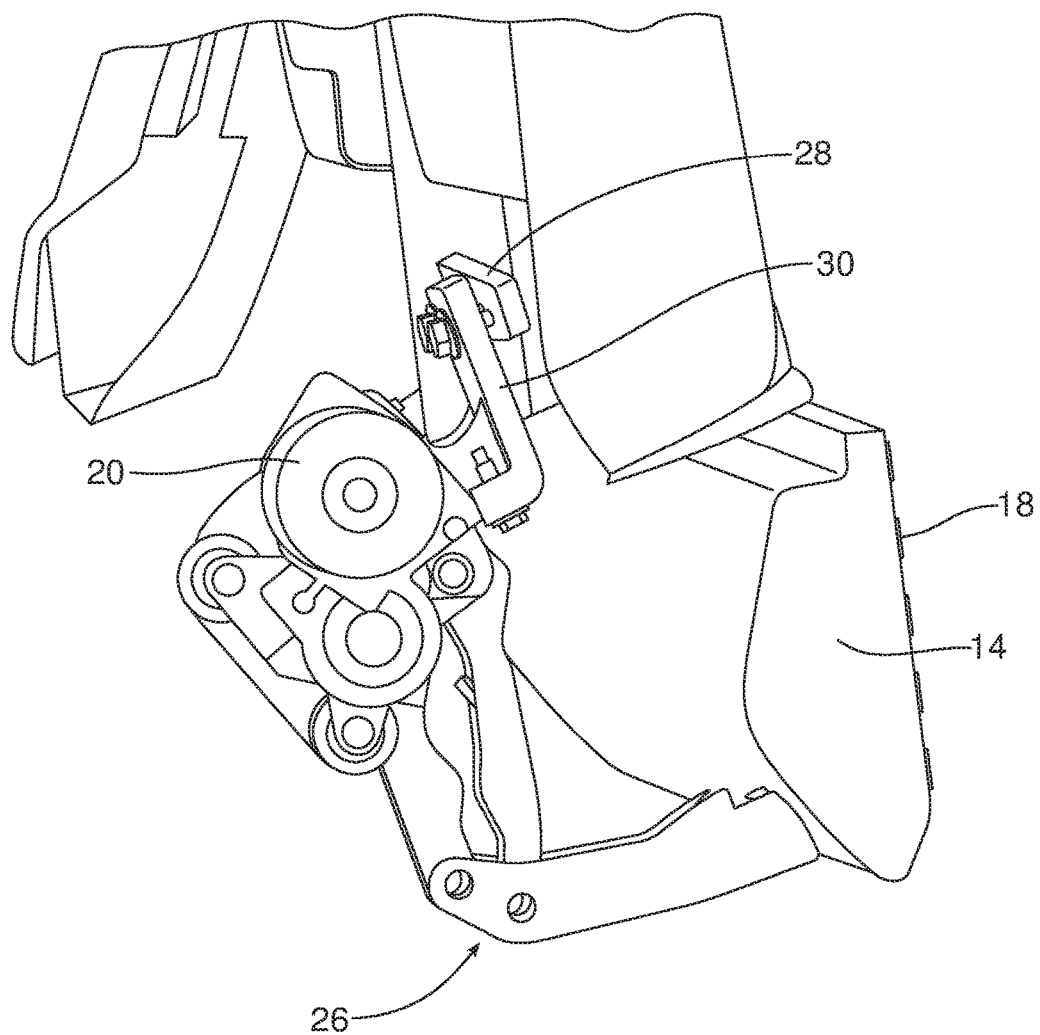
FIG. 3c is a detailed perspective view illustrating the first actuator, linkage and combined running board and side skirt in the aero-skirt position.

FIG. 1 is a schematic block diagram of the integrated running board and side skirt system 10 which includes a control module 12 adapted to displace a combined running board and side skirt 14 between a stowed position illustrated in FIGS. 2*a* and 3*a*, a running board position illustrated in FIGS. 2*b* and 3*b* and an aero-skirt position illustrated in FIGS. 2*c* and 3*c*.

In the embodiment illustrated in FIGS. 2*a* and 3*a*, when the combined running board and side skirt 14 is in the stowed position, it is positioned along the rocker panel 16 where it is raised and protected. In this position, ground clearance is maximized for off-road or other motor vehicle operation.

When the combined running board and side skirt 14 is in the running board position illustrated in FIGS. 2*b* and 3*b*, the combined running board and side skirt is lowered and extended outboard of the rocker panel 16 to provide a convenient step to aid one to enter into the motor vehicle through either of the overlying cabin doors 15. Note the tread surface 18 of the combined running board and side skirt 14 that is oriented upward in order to provide for improved traction.

In the aero-skirt position illustrated in FIGS. 2*c* and 3*c*, the combined running board and side skirt 14 is positioned with the tread surface 18 oriented outward and substantially covering the rocker panel 16. In this position the combined running board and side skirt 14 functions to divert air from flowing underneath the motor vehicle along the undercarriage and thereby reduces the aerodynamic drag of the motor vehicle. In this position the combined running board and side skirt 14 provides a means for increasing the operating efficiency and fuel economy of the motor vehicle when operated on smooth roadway surfaces at higher speeds.

As best illustrated in FIG. 1, the control module 12 includes a first actuator 20, a second actuator 22 and a controller 24. As should be appreciated from viewing FIG. 3*a*-3*c*, the combined running board and side skirt 14 is connected by means of an articulating linkage 26 to a support surface 28 of the motor vehicle. In the illustrated embodiment the first actuator 20 is a rotary actuator fixed to the support surface 28 by means of a mounting bracket 30. Thus, as should be appreciated, the first actuator 20 is connected between the support surface 28 of the motor vehicle and the articulating linkage 26.

Figure 5:
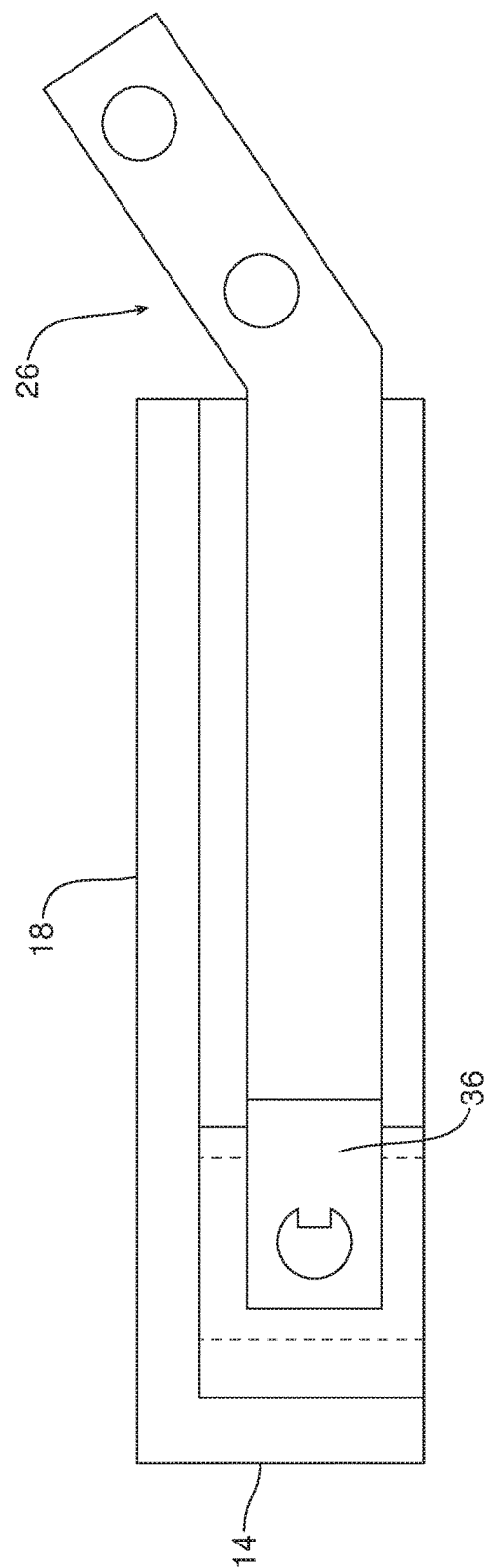
FIG. 5 is a cross sectional view along line 5-5 of FIG. 4.

As best illustrated in FIGS. 4 and 5, the second actuator 22 may comprise a rotary actuator or electric motor that is fixed in a cavity 32 to the combined running board and side skirt 14. The rotary actuator 22 has a drive shaft 34 keyed to an end 36 of the articulating linkage 26. Thus, it should be appreciate that the second actuator 22 is connected between the articulating linkage 26 and the combined running board and side skirt 14.

The controller 24 comprises a computing device such as a dedicated microprocessor or electronic control unit (ECU) operating in accordance with instructions from appropriate control software. Thus, it should be appreciated that the controller 24 may comprise one or more processors, one or more memories and one or more network interfaces all communicating with each other over a communication bus.

In the embodiment illustrated in FIG. 1, the controller 24 is configured to include a timer 38 adapted to provide a timer function, the significance of which will be described below. In addition, the controller 24 includes a data input 40 to receive motor vehicle speed data from a motor vehicle speed monitoring device 42. The controller 24 also includes a data input 44 for receiving motor vehicle transmission status data from a transmission status monitoring device 46.

The controller 24 further includes a data input 48 for receiving door position status data (e.g. door open or door closed) from a cabin door position status monitoring device 50 of a type known in the art. Further, the controller 24 includes a data input 52 for receiving blind spot monitoring data from a blind spot monitoring device 54 of a type known in the art.

As further illustrated in FIG. 1, the controller 24 includes a data input 56 for receiving drive mode selector data from a drive mode selector monitoring device 58 of a type known in the art. Still further, the controller 24 includes a data input 60 for receiving battery charge state data from a battery state monitoring device 62 of a type known in the art.

Consistent with the above description, a method is provided of deploying an aerodynamic side skirt. That method may be broadly described as comprising the step of displacing, by the control module 12, the combined running board and side skirt 14 between the stowed position illustrated in FIGS. 2*a* and 3*a*, the running board position illustrated in FIGS. 2*b* and 3*b* and the aero-skirt position illustrated in FIGS. 2*c* and 3*c*.

The method may further include the step of monitoring, by the controller 24, motor vehicle speed through the data input 40 and the motor vehicle speed monitoring device 42. Further, the method may include the step of monitoring the status of the transmission of the motor vehicle by means of the controller 24 through the data input 44 and the transmission status monitoring device 46.

Still further, the method may include the step of monitoring the position status of the doors of the motor vehicle by means of the controller 24 through the data input 48 and the cabin door position status monitoring device 50. Still further, the method may include the step of monitoring, blind spot status by means of the controller 24 through the data input 52 and the blind spot monitoring device 54.

As should be further appreciated, the method may also include the step of monitoring the drive mode of the motor vehicle by means of the controller 24 through the data input 56 and the drive mode selector monitoring device 58. Still further, the method may include the step of monitoring the charge state of the motor vehicle battery by means of the controller 24 through the data input 60 and the battery state monitoring device 62. Further, the method may include the step of configuring the controller 24 to include a timer 38 in order to provide a timer function.

The method may also include the step of displacing the combined running board and side skirt 14 into the stowed position, the running board position or the aero-skirt position in response to data received by the controller 24 respecting motor vehicle speed. Still further, the method may also include the step of displacing the combined running board and side skirt 14 into the stowed position, the running board position or the aero-skirt position in response to data received by the controller respecting transmission state and cabin door position status.

The following operating strategy is presented merely as an example for purposes of illustration and should not in any way be considered as limiting in scope. Other operating strategies could be utilized and the controller 24 may be programmed with a number of different operating strategies. Whenever the cabin door 15 above the combined running board and side skirt 14 is closed, the motor vehicle is at rest with the transmission in park and the battery charge state is above a predetermined level, the combined running board and side skirt 14 will be in the stowed position illustrated in FIGS. 2a and 3a. When an operator opens the cabin door 15 above the combined running board and side skirt 14, the controller 24 may be configured to displace the combined running board and side skirt to the running board position shown in FIGS. 2b and 3b to allow an operator to more easily enter or exit the motor vehicle.

After entering the motor vehicle, the operator will close the cabin door 15 above the combined running board and side skirt 14. The controller 24 may then be configured to initiate the timer 38 and then to displace the combined running board and side skirt 14 into the stowed position after a predetermined period of time has elapsed. That predetermined period of time may be, for example, three seconds. If the cabin door 15 is reopened during the three second timeout, the combined running board and side skirt 14 is maintained in the running board position and the timer is restarted from zero when the door closes again.

In the event the motor vehicle is then operated at a speed in excess of a predetermined or threshold speed such as 60 MPH or 100 KPH, the transmission status is in overdrive, the blind spot monitor is clear and the drive mode selector is in normal or economy or ECO (if applicable), then the controller will displace the combined running board and side skirt 14 into the aero-skirt position after a predetermined period of time such as 15 seconds as determined by the timer 38. See FIGS. 2c and 3c. If at any time during the 15 second hold or timeout period any of the above conditions are broken, the controller 24 will maintain the combined running board and side skirt 14 in the stowed position. The timer 38 is then restarted from zero once all the conditions are met again.

In contrast to the above, if the motor vehicle threshold speed has been exceeded and the drive mode is in normal or ECO, data from the blind spot monitoring device 54 received at the data input 52 indicating a motor vehicle present in the blind spot will cause the controller 24 to hold the combined running board and side skirt 14 in the stowed position. This is also true if the drive mode selector monitoring device 58 provides data at the input 56 indicating that the motor vehicle is in sport transmission mode.

When the combined running board and side skirt 14 is in the aero-skirt position, the controller 24 may be configured to displace the combined running board and side skirt 14 into the stowed position once (a) the motor vehicle speed as indicated by the motor vehicle speed monitoring device 42 at the data input 40 is below a lower threshold value such as 55 MPH or 90 KPH, so long as the blind spot monitoring device indicates a clear signal at the data input 52 or (b) the transmission is moved out of overdrive as indicated by the transmission status monitoring device 46 at the data input 44 and the blind spot monitor indicates clear or (c) the drive mode selector monitoring device indicates exit from normal or ECO mode and the blind spot monitor indicates clear.

The controller 24 would also be equipped with a manual override where either feature could be turned off separately. For example if the running board position function is manually turned off while deployed, the controller 24 could be configured to pause until the cabin door position status monitoring device 50 provides a door closed signal at the data input 48. Under such a circumstance the controller 24 would not return the combined running board and side skirt 14 to the running board position until that feature was turned back on by means of the manual switch. The controller 24 could, however, be configured to maintain the aero-skirt position function if desired.

If the aero-skirt position function were manually turned off while deployed, the controller 24 could be configured to pause until the blind spot monitoring device 54 indicates a clear signal at the data input 52 at which time the controller 24 would displace the combined running board and side skirt 14 to the stowed position. The controller 24 could be configured to not return the combined running board and side skirt 14 to the aero-skirt position until that feature was turned back on via the manual switch. The controller 24 could also be configured to continue to allow displacement of the combined running board and side skirt 14 into the running board position when the side skirt position feature has been turned off.

The foregoing has been presented for purposes of illustration and description. It is not intended to be exhaustive or to limit the embodiments to the precise form disclosed. Obvious modifications and variations are possible in light of the above teachings. For example, while the illustrated embodiment includes only one set of actuators 20, 22 and linkage 26 for the combined running board and side skirt 14, it should be appreciated that two sets may be provided. All such modifications and variations are within the scope of the appended claims when interpreted in accordance with the breadth to which they are fairly, legally and equitably entitled.

What is claimed:

1. An integrated running board and side skirt system for a motor vehicle, comprising:
    a combined running board and side skirt; and
    a control module displacing said combined running board and side skirt between a stowed position, a running board position and an aero-skirt position;
    wherein the aero-skirt position is adapted to divert air from flowing underneath the motor vehicle to along an undercarriage, thereby reducing aerodynamic drag of the motor vehicle.

2. The integrated running board and side skirt system of claim 1, including an articulating linkage connecting said combined running board and side skirt to said motor vehicle.

3. The integrated running board and side skirt system of claim 2, wherein said control module includes a first actuator connected between a support surface of said motor vehicle and said articulating linkage, a second actuator connected between said articulating linkage and said combined running board and side skirt and a controller configured to displace said combined running board and side skirt between said stowed position, said running board position and said aero-skirt position in response to a current speed of said motor vehicle.

4. The integrated running board and side skirt system of claim 3, wherein said controller is configured to include a timer.

5. The integrated running board and side skirt system of claim 3, wherein said controller is configured to include a data input for transmission state.

6. The integrated running board and side skirt system of claim 3, wherein said controller is configured to include a data input for vehicle speed.

7. The integrated running board and side skirt system of claim 3, wherein said controller is configured to include a data input for cabin door position.

8. The integrated running board and side skirt system of claim 3, wherein said controller is configured to include a data input for battery state.

9. The integrated running board and side skirt system of claim 3, wherein said controller is configured to include a data input for blind spot monitor status.

10. The integrated running board and side skirt system of claim 3, wherein said controller is configured to include a data input for drive mode selector status.

11. A method of deploying an aerodynamic side skirt of a motor vehicle, comprising:
displacing, by control module having a controller, a combined running board and side skirt between a stowed position, a running board position and an aero-skirt position, wherein the aero-skirt position is adapted to divert air from flowing underneath the motor vehicle to along an undercarriage, thereby reducing aerodynamic drag of the motor vehicle; and
monitoring motor vehicle speed by said controller.

12. The method of claim 11, including monitoring transmission state by said controller.

13. The method of claim 12, including monitoring cabin door position status by said controller.

14. The method of claim 13, including monitoring battery charge state by said controller.

15. The method of claim 14, including monitoring drive mode selector status by said controller.

16. The method of claim 15, including configuring said controller to provide a timer.

17. The method of claim 16, including monitoring blind spot monitor status by said controller.

18. The method of claim 17, including displacing said combined running board and side skirt into said stowed position, said running board position or said aero-skirt position in response to data received by said controller respecting motor vehicle speed.

19. The method of claim 17, including displacing said combined running board and side skirt into said stowed position, said running board position or said aero-skirt position in response to data received by said controller respecting transmission state and cabin door position status.

20. The system of claim 1, wherein the combined running board and side skirt includes a tread surface, and wherein the tread surface is oriented upward in the running board position and is oriented outward in the aero-skirt position.

21. The method of claim 11, wherein the combined running board and side skirt includes a tread surface, and wherein the tread surface is oriented upward in the running board position and is oriented outward in the aero-skirt position.

* * * * *